US011022237B2

United States Patent
Clemente et al.

(10) Patent No.: US 11,022,237 B2
(45) Date of Patent: Jun. 1, 2021

(54) HOSE ASSEMBLIES WITH REDUCED AXIAL STRESS

(71) Applicant: Titeflex Commercial Inc., Springfield, MA (US)

(72) Inventors: Michael C. Clemente, Huntington, MA (US); Gregory P. Rooke, Springfield, MA (US); Ken Slock, Alton, NH (US)

(73) Assignee: Titeflex Commercial Inc., Springfield, MA (US)

( * ) Notice: Subject to any disclaimer, the term of this patent is extended or adjusted under 35 U.S.C. 154(b) by 0 days.

(21) Appl. No.: 15/443,673

(22) Filed: Feb. 27, 2017

(65) Prior Publication Data

US 2018/0245717 A1     Aug. 30, 2018

(51) Int. Cl.
　　*F16L 11/00*　　　(2006.01)
　　*F16L 11/08*　　　(2006.01)
　　*F16L 57/06*　　　(2006.01)

(52) U.S. Cl.
　　CPC .............. *F16L 11/08* (2013.01); *F16L 57/06* (2013.01)

(58) Field of Classification Search
　　CPC .................................. F16L 11/08; F16L 57/06
　　USPC .......................... 138/126, 138, 174, DIG. 8
　　See application file for complete search history.

(56) References Cited

U.S. PATENT DOCUMENTS

| | | | |
|---|---|---|---|
| 2,544,119 A * | 3/1951 | Hix ......................... | F16L 11/08 137/355.26 |
| 2,544,120 A * | 3/1951 | Hix ....................... | F16L 11/088 137/355.26 |
| 2,778,609 A * | 1/1957 | Peeps ...................... | B05B 9/002 165/164 |
| 2,998,028 A * | 8/1961 | Rohde ................... | F16L 11/121 138/109 |
| 3,206,228 A * | 9/1965 | Burrell .................. | F16L 27/107 285/47 |
| 3,379,220 A * | 4/1968 | Kiuchi .................... | F16L 9/133 138/125 |
| 3,420,553 A | 1/1969 | Poxon et al. | |
| 3,727,029 A * | 4/1973 | Chrow .................... | F24H 1/142 392/468 |

(Continued)

FOREIGN PATENT DOCUMENTS

EP         2143984 A1     1/2010

OTHER PUBLICATIONS

Seismic Split Bend Stiffener, available at http://www.trelleborg.com/en, Web printout Jul. 12, 2017, 7 pages.

(Continued)

*Primary Examiner* — James F Hook
(74) *Attorney, Agent, or Firm* — Patterson Thuente Pedersen, P.A..

(57) ABSTRACT

A hose assembly with reduced axial stress including an underlying hose, such as a composite hose, and one or more elongate matrices extending over a portion of the hose along an axis of vibration. The elongate matrices can be an extruded, molded, or braided matrix formed of engineered fibers, metallic materials, and/or elastomeric materials formulated to impart a desired amount of rigidity along an axis of vibration to which it is applied. The elongate matrix can be a composite matrix including one or more rigid members, such as wire rods, embedded in an elastomeric matrix which is chemically and/or mechanically coupled to the underlying hose.

16 Claims, 5 Drawing Sheets

(56) References Cited

U.S. PATENT DOCUMENTS

| | | | | |
|---|---|---|---|---|
| 4,463,779 A * | 8/1984 | Wink | F16L 11/121 | 138/103 |
| 4,652,475 A * | 3/1987 | Haney | C08J 5/128 | 138/137 |
| 4,669,508 A * | 6/1987 | Neaves | B29D 23/006 | 138/121 |
| RE32,508 E * | 9/1987 | Feucht | F16L 11/083 | 138/119 |
| 5,062,457 A * | 11/1991 | Timmons | F16L 11/088 | 138/109 |
| 5,236,036 A * | 8/1993 | Ungemach | E21B 17/20 | 138/139 |
| 5,381,834 A * | 1/1995 | King | F16L 11/085 | 138/103 |
| 5,413,147 A | 5/1995 | Moreiras et al. | | |
| 5,803,129 A * | 9/1998 | Coronado | F16L 11/10 | 138/125 |
| 5,899,236 A * | 5/1999 | Coronado | F16L 11/10 | 138/109 |
| 5,901,755 A | 5/1999 | Winter et al. | | |
| 5,908,049 A * | 6/1999 | Williams | E21B 17/206 | 138/125 |
| 6,827,109 B2 * | 12/2004 | McCaughtry | F16L 11/112 | 138/122 |
| 8,783,300 B2 * | 7/2014 | Hahn | F16L 11/086 | 138/125 |
| 2003/0116216 A1 * | 6/2003 | Espinasse | F16L 11/08 | 138/172 |
| 2005/0170118 A1 | 8/2005 | Cleveland et al. | | |
| 2006/0118195 A1 * | 6/2006 | Arima | B29C 57/04 | 138/126 |
| 2006/0134361 A1 * | 6/2006 | Niki | B32B 1/08 | 428/36.91 |
| 2007/0137718 A1 * | 6/2007 | Rushlander | F16L 11/08 | 138/121 |
| 2008/0072986 A1 * | 3/2008 | Burrowes | B29C 53/581 | 138/126 |
| 2008/0156388 A1 | 7/2008 | Wintrebert | | |
| 2008/0236694 A1 * | 10/2008 | Takagi | F16L 11/082 | 138/109 |
| 2009/0114304 A1 * | 5/2009 | Mohri | F16L 11/15 | 138/138 |
| 2009/0199923 A1 * | 8/2009 | Standal | B29C 70/08 | 138/124 |
| 2010/0032047 A1 * | 2/2010 | Mennig | F16L 11/085 | 138/125 |
| 2010/0071795 A1 * | 3/2010 | Montalvo | F16L 11/085 | 138/126 |
| 2011/0041943 A1 * | 2/2011 | Donnelly | F16L 11/124 | 138/137 |
| 2011/0136672 A1 * | 6/2011 | Buta | H01L 39/2403 | 505/230 |
| 2011/0232796 A1 | 9/2011 | Weiss et al. | | |
| 2013/0263964 A1 * | 10/2013 | Jones | B29C 70/20 | 138/174 |
| 2016/0153591 A1 | 6/2016 | Fonfara et al. | | |
| 2016/0245432 A1 | 8/2016 | Fonfara et al. | | |
| 2016/0258559 A1 | 9/2016 | Rooke et al. | | |

OTHER PUBLICATIONS

Flex-Weld Incorporated products catalog, available at http://www.flex-weld.com/braided-pump-connectors.html, Web printout Jul. 12, 2017, 4 pages.

Southeastern Hose, Inc. General Products Catalog, available at http://www.sehose.com/, Web printout Jul. 12, 2017, 1 page.

Vibration eliminators, AC&R Products Catalog, available at http://www.r744.com/assets/link/Henry-VibEliminatorCatalogueInfo.pdf, Web. printout Jul. 12, 2017, 3 pages.

\* cited by examiner

HOSE ASSEMBLIES WITH REDUCED AXIAL STRESS

TECHNICAL FIELD

The invention is generally directed to hose assemblies for transport of fluids, and more particularly to a hose assembly having at least one elongate matrix to provide reduced axial stress along at least one axis of vibration while maintaining flexibility along other axes.

BACKGROUND

Hoses are used to transport a variety of fluids in various applications. In many applications, such as in automotive and aerospace industries, in which hydraulic fluids and fuels are transported via a series or network of hoses throughout the vehicle, the vehicle is subjected to high vibrations. The high vibrations causes continual or ongoing forces and stresses on the hoses, which if not sufficiently rigid, can cause accelerated wear and tear and abrasions, which can result in potential leak paths and, in the worst case, catastrophic failure of the hose assembly.

Imparting rigidity on the overall hose assembly to dampen the vibrations is one method of reducing the axial stress on the hose assembly. However, it is often desirable to maintain at least some flexibility of the hose assembly. There remains an unmet need for a cost-effective hose assembly that is capable of withstanding high vibration environments while maintaining at least some flexibility for use in high vibration applications such as automobile and aircraft engines.

SUMMARY OF THE INVENTION

Embodiments of the invention are directed to a hose assembly with reduced axial stresses caused by vibration in hoses during use in high vibration applications. Such applications can include fuel or hydraulic lines in aerospace and automotive applications including, for example, planes, jets, shuttles, cars, trucks, buses, semis, and the like applications in which extreme high vibrations can be imparted on the hoses. The hose assemblies according to embodiments impart rigidity in at least one axis, particularly along the axes or in the plane in which the hose experiences the most vibration, while maintaining a full or substantially full degree of flexibility in other axes.

In embodiments of the invention, a hose assembly with reduced axial stress includes an underlying hose, such as a composite hose, and one or more elongate matrices extending over a portion of the hose along an axis of vibration. The elongate matrices can comprise an extruded, molded, or braided matrix formed of engineered fibers, metallic materials, and/or elastomeric materials formulated to impart a desired amount of rigidity along an axis of vibration to which it is applied. In one embodiment, an elongate matrix comprise a composite matrix which includes one or more rigid members, such as wire rods, embedded in an elastomeric matrix which is chemically and/or mechanically coupled to the underlying hose.

In embodiments, engineered fiber can include, for example, fiberglass, polyamide fibers, and the like, or combinations thereof. Metallic materials can include, for example, drawn wire or a metallic coating formed from stainless steel, spring steel, corrosion resistant steel, polymer-coated steel, and the like, or combinations thereof. Elastomeric materials can include any of a variety of elastomeric polymers such as, for example, silicon, or composite matrix reinforcement materials.

In embodiments, the elongate matrix extends along a partial length or an entire length of the hose between 10 and 120 degrees about the circumference of the hose in order maintain flexibility in the other axes, more particularly about 30 to about 100 degrees, and more particularly about 45 to about 90 degrees. In one particular embodiment of the invention, a pair of elongate matrices spaced approximately 180 degrees apart about the hose such that they are both in the plane of vibration. However, it can be contemplated that the pair of matrices can be spaced about the circumference of the hose at any of a variety of distances, such as, for example, 60 degrees, 90 degrees, or 120 degrees so as to impart rigidity in multiple axes of vibration or in the event the plane of vibration is offset from the longitudinal axis of the hose assembly.

The elongate matrices are configured to provide stiffness in the axis of vibration by absorbing the energy or forces to attenuate the vibration of the hose. The attenuated vibration produces less axial stress on hose assembly, thereby elongating the life of the hose and reducing the risk of hose failure.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 1:
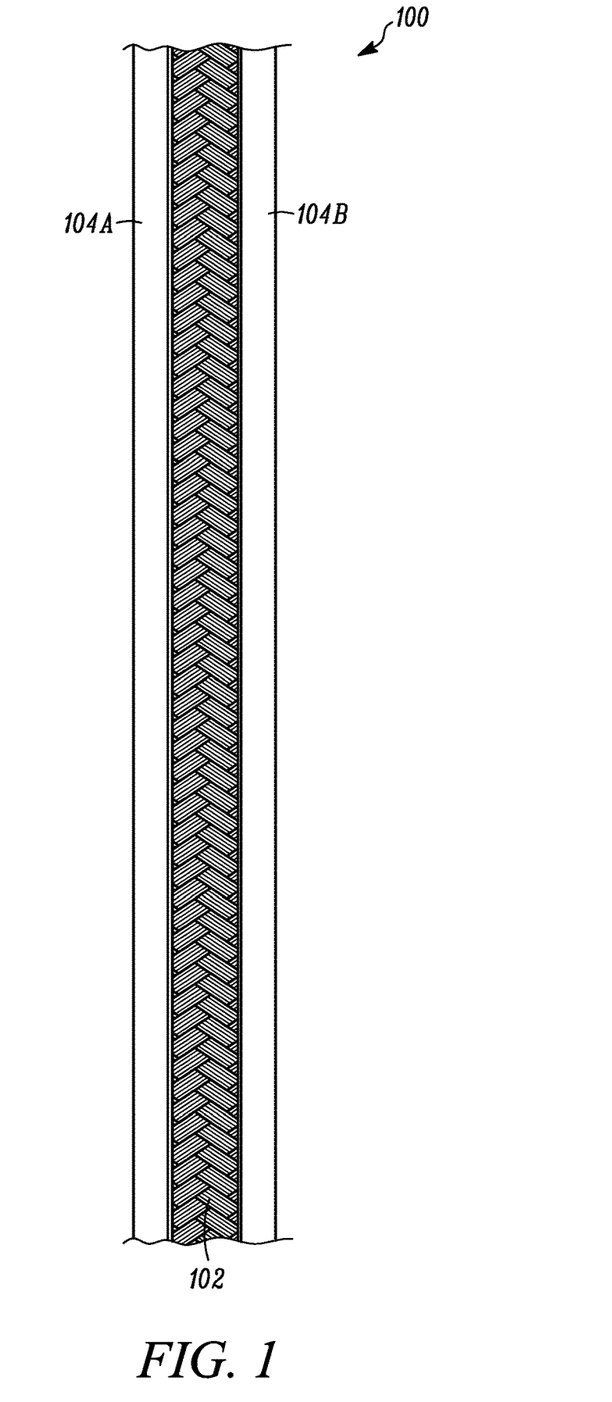
FIG. 1 is a top view of a hose assembly having two elongate matrices according to an embodiment of the invention.
Figure 2:
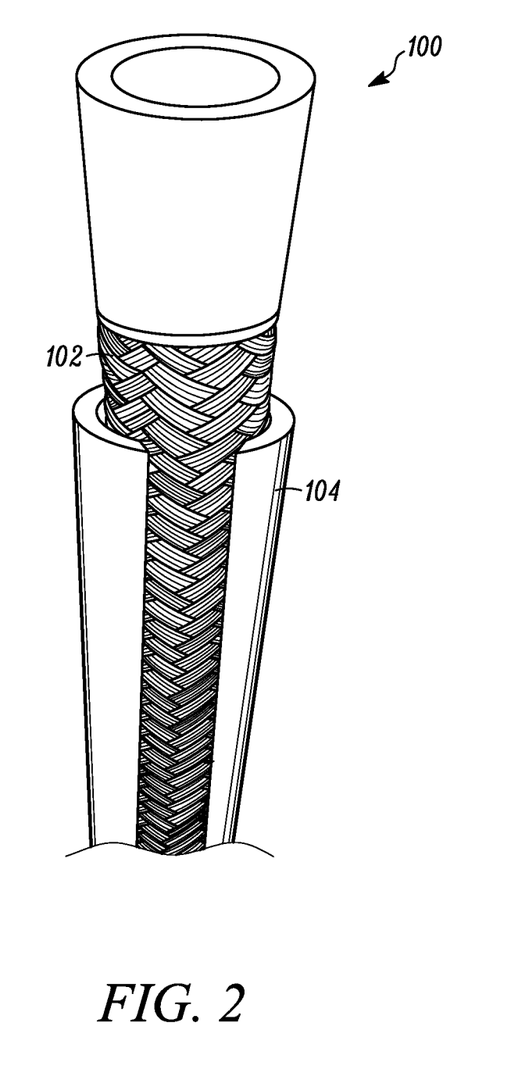
FIG. 2 is a perspective view of an end of the hose assembly of FIG. 1.

According to an embodiment of the invention and referring to FIGS. 1 and 2, a hose assembly 100 can generally comprise a composite hose 102, and at least one elongate matrix 104 which imparts rigidity in at least one plane in which hose 102 is subject to the most vibration in use. In a particular embodiment depicted in FIGS. 1 and 2, hose assembly 100 includes two matrices 104a, 104b, spaced approximately 180 degrees about a circumference of underlying hose 102. However, one of skill in the art would recognize that if more than one elongate matrix is present, they can be spaced apart from one another at any of a variety of varying degrees to impart rigidity in one or more axes, while maintaining flexibility in other axes. The matrices provide a means of dampening the vibrations along the axis to which they are applied.

The elongate matrices, and in this particular embodiment, 104a, 104b, extend along a portion or an entirety of a length of underlying hose 102 to impart rigidity along at least one axis of hose assembly 100. Elongate matrices 104a, 104b can comprise, for example, an extruded, braided, or molded matrix and can be formed of engineered fibers, metallic materials, and/or elastomeric materials formulated to a desired amount of rigidity in the axis of vibration. Engineered fiber can include, for example, fiberglass, polyamide fibers, and the like, or combinations thereof. Metallic materials can include, for example, drawn wire or a metallic coating formed from stainless steel, spring steel, corrosion resistant steel, polymer-coated steel, and the like, or combinations thereof. Elastomeric materials can include any of a variety of elastomeric polymers such as, for example, silicon.

In embodiments, elongate matrices 104a, 104b extends along a partial length or an entire length of hose 102 and between 10 and 120 degrees about the circumference of exterior surface of hose 102 in order maintain flexibility in the other axes. In the embodiment depicted in FIGS. 1 and 2, a pair of elongate matrices is spaced approximately 180 degrees apart about an exterior surface of hose 102 such that they are both a plane of vibration that is transverse to a longitudinal axis of hose assembly 100. However, it can be contemplated that the pair of matrices can be spaced about the circumference of the hose at any of a variety of distances, such as, for example, 60 degrees, 90 degrees, or 120 degrees so as to impart rigidity in multiple axes of vibration or in the event the plane of vibration is offset from the longitudinal axis of the hose assembly.

Figure 3:
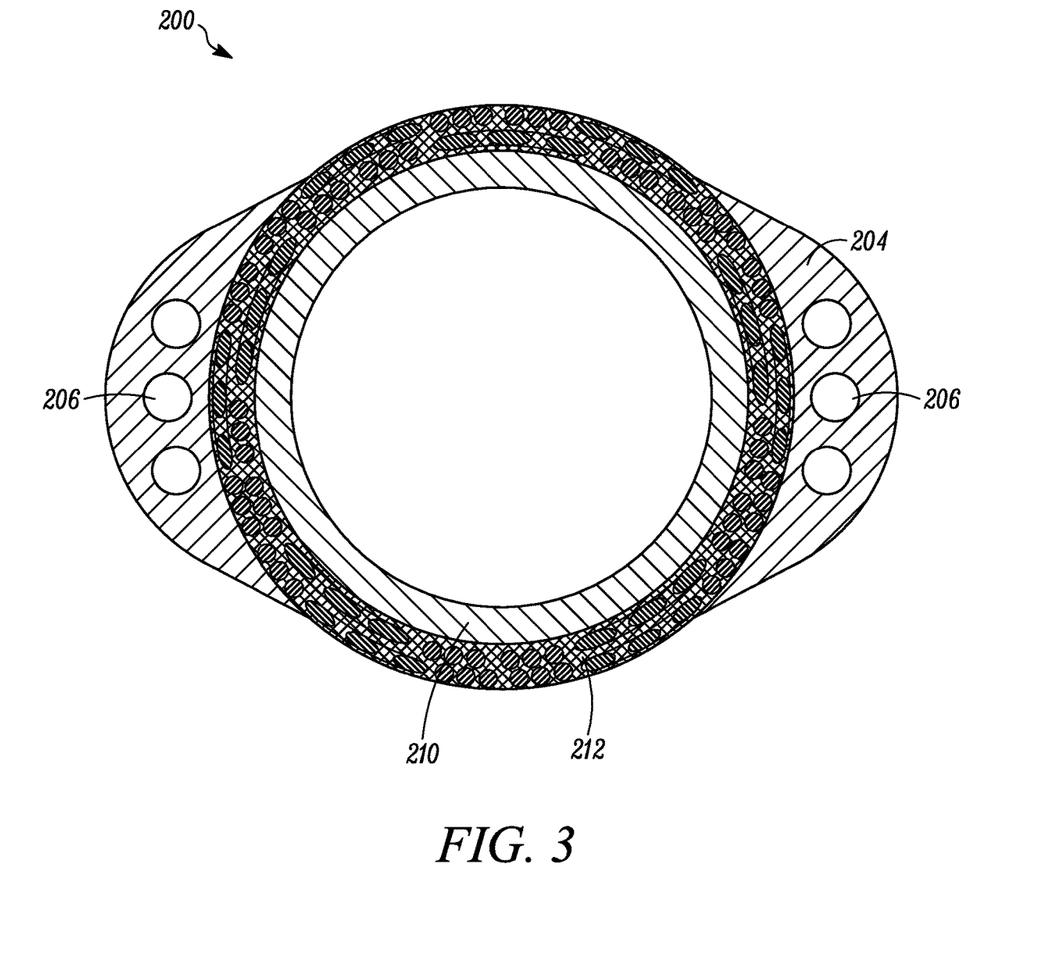
FIG. 3 is a cross-sectional view of a hose assembly having two elongate matrices with stiffening rods according to another embodiment of the invention.

In an alternative embodiment, and referring to FIG. 3, a hose assembly 200 includes an underlying composite hose 202 and one or more elongate composite matrices 204, which includes a plurality of rigid members 206, such as wire rods, embedded in each or at least one of the elastomeric matrices 204 which is chemically and/or mechanically coupled to the underlying hose. Rigid member(s) 206 can comprise, for example, steel wire, spring steel wire, corrosion resistant steel wire, polymer coated steel wire, plastic or polymer wire, and/or any of a variety of combinations thereof. Rigid member(s) 206 can comprise, for example, a stiffened wire 206 having a spring constant based on the application of hose assembly 200 to tune the vibration.

In embodiments in which rigid member(s) 206 are present, rigid member(s) 206 can extend an entire length of matrix, or only a portion thereof. In another embodiment (not shown), one or more rigid members are present in a first elongate matrix along the underlying hose, and not present in a second elongate matrix spaced apart from the first elongate matrix about a circumference of the underlying hose. In yet another embodiment of the invention (not shown) a first elongate matrix, with or without rigid member(s), is bonded to an exterior surface of the underlying hose, while a second elongate matrix, with or without rigid member(s), is bonded to an interior surface of the underlying hose, at a similar location about the circumference of the hose, and/or spaced apart from the location of the first elongate matrix about the circumference of the hose.

Figure 4:
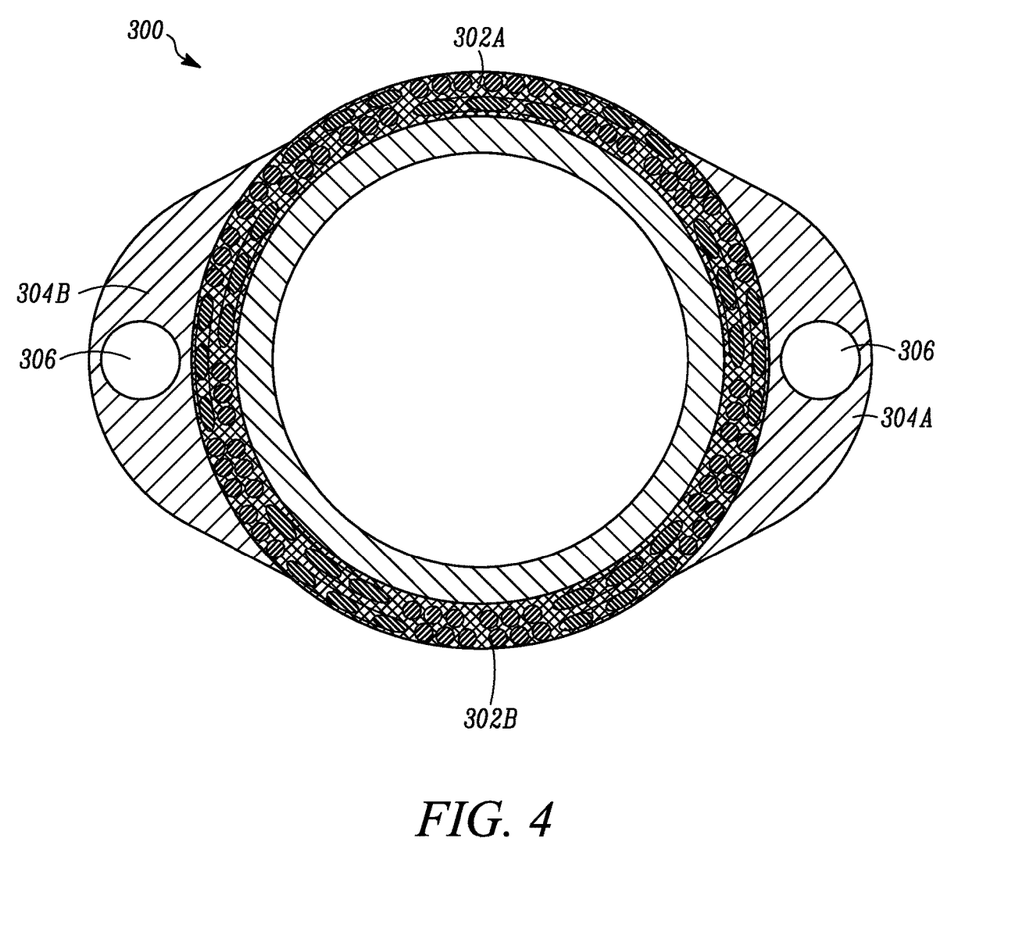
FIG. 4 is a cross-sectional view of a hose assembly having two elongate matrices with a stiffening rod in each matrix according to another embodiment of the invention.

In yet another embodiment, and referring to FIG. 4, a hose assembly 300 includes an underlying composite hose 302 including an inner tube 302a and a braided jacket 302b, and one or more elongate composite matrices 304a,b, each of which includes a single rigid members 306, such as wire rods, embedded in an elastomeric matrix 304 which is chemically and/or mechanically coupled to the underlying hose. Rigid members 306 can comprise, for example, steel wire, spring steel wire, corrosion resistant steel wire, polymer coated steel wire, plastic or polymer wire, and/or any of a variety of combinations thereof. Rigid members 306 can comprise, for example, a stiffened wire 306 having a spring constant based on the application of hose assembly 306 to tune the vibration.

Figure 5:
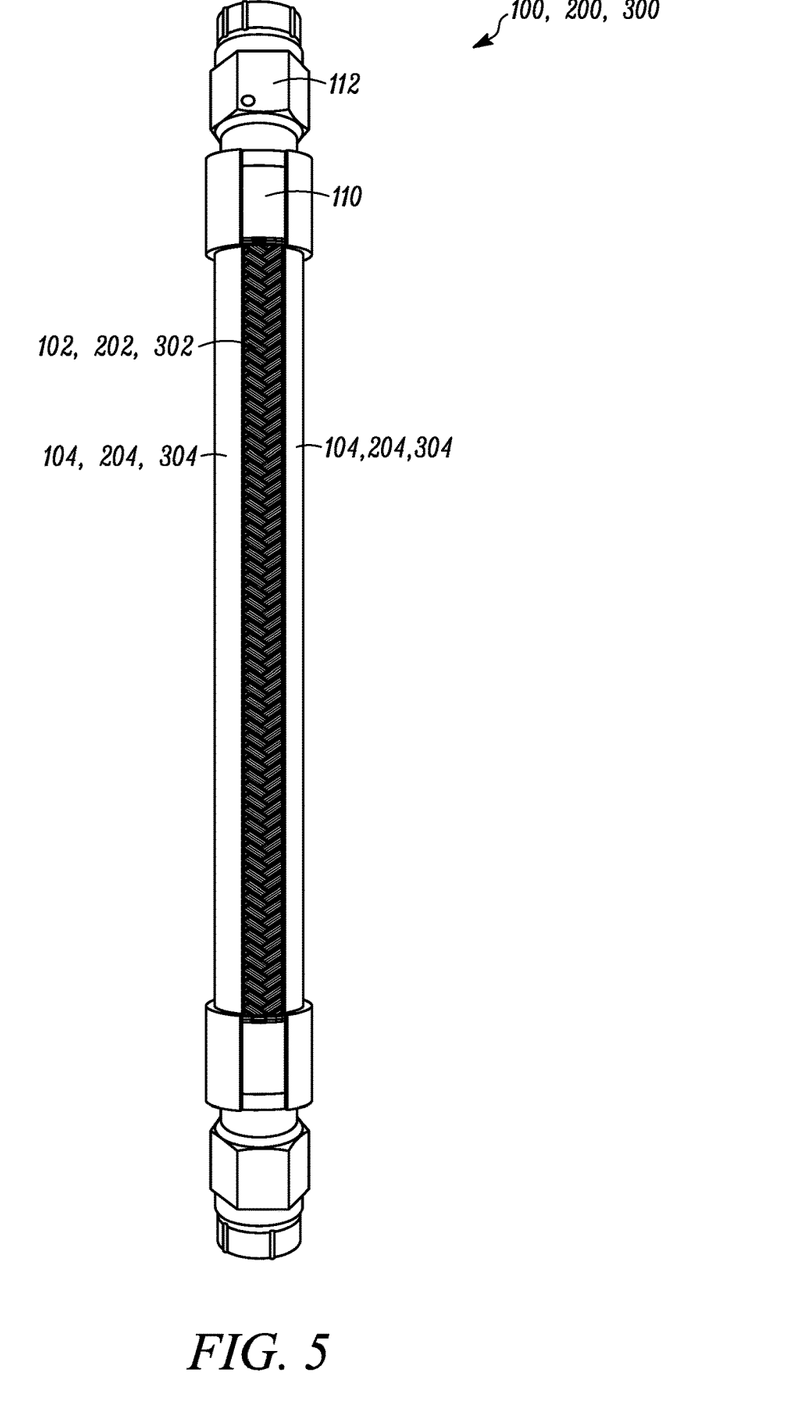
FIG. 5 is a top view of a hose assembly having two elongate matrices according to an embodiment.

In an embodiment, as depicted in FIG. 5, hose assembly 100, 200, or 300 including the one or more elongate elastomeric matrices 104, 204, 304, can extend not only along a length of the hose 102, 202, 302 but over end cuff portions 110 and/or couplings 112, if present, to provide vibration dampening along an entire length of the hose assembly.

In any of the embodiments, the elongate matrix or matrices are bonded either physically, such as by sintering, and/or chemically to the underlying hose. In one particular embodiment, the elongate matrix is extruded or molded to an exterior surface of the underlying hose. The elongate matrix is then cured or otherwise set. Optionally, a braided jacket, such as a polyester jacket, can be formed over the one or more matrices to aid in holding the matrices in place. In another embodiment in which rigid member(s) are incorporated into the matrix, a temporary collar is used to hold the rigid member(s) in place until the matrix is molded or otherwise set in place to encapsulate the rigid member(s) and bond it to the underlying hose.

In embodiments, underlying hose 102, 202 can comprise any of a variety of composite hoses suitable for use in application in which high vibration forces and stresses are incurred along one or more axes of hose 102. 202. Suitable composite hoses can include, as depicted in FIG. 3, for example, an inner tube 210 and a jacket 212 circumferentially surrounding inner tube 210, and optionally one or more resins (not shown) infused within and over jacket 212.

In embodiments, inner tube 210 can be composed of a polymer, for example, a fluoropolymer, such as, but not limited to, polytetrafluoroethylene (PTFE). In some embodiments, the inner tube is completely or partially conductive. For example, an innermost section of inner tube 210 (i.e., the inner surface adjacent to a longitudinal axis of inner tube 210) can be conductive. The thickness of this innermost section can be defined as a percentage of the entire thickness of inner tube 210 can, for example, an innermost 5%, 10%, 15%, 20%, 25%, and the like. Inner tube 210 or a section thereof can be rendered conductive by the incorporation of metal particles (e.g., copper, aluminum, gold, silver, nickel, and the like), carbon black, carbon fibers, or other conductive additives, and/or can be formed of a conductive material, such as a conductive elastomeric material.

The conductivity of the innermost region can be controlled by varying the amount of conductive particles added to the polymer. In some embodiments, the innermost region contains between about 0.5% and about 2.5% conductive particles by weight, between about 1.5% and about 2.5% conductive particles by weight, and the like. Inner tube 210 can, in some embodiments, have a high orientation index, which is a measure of the degree of orientation of the fluoropolymer (e.g. PTFE) chains in the longitudinal direction versus that of the transverse direction. An orientation index of zero (0) means that the fluoropolymer chains are randomly oriented. An orientation index of one (1) means that all of the fluoropolymer chains are oriented in the longitudinal direction.

In an alternative embodiment not shown, the entire inner tube is conductive. In yet another alternative embodiment not shown, the entire inner tube is non-conductive.

In embodiments, jacket 212 can be formed from a plurality of plaits 206 of fiberglass lace. The fiberglass lace, in turn, can optionally incorporate PTFE. Suitable fiberglass lace is available under the A-A-52083 (Type IV) specification from a variety of sources including Breyden Products, Inc. of Columbia City, Ind.; Western Filament, Inc. of Grand Junction, Colo.; and W.F. Lake Corp. of Glens Falls, N.Y. Of course, in various alternatives, other materials could be used to form jacket 212. For example, different polymers could be used to make braids, lace, or other arrangements to form alternatives to jacket 212. In other embodiments, the jacket can be formed from a plurality of strands or filaments of carbon fiber, carbon-carbon fiber, para aramid fibers, fiberglass yarns, alumina fibers, boron fibers, boron nitride fibers, silica fibers, silica nitride fibers, or mixtures thereof, and each fiber may also optionally be coated with fluoropolymer, such as, but not limited to, PTFE.

In some embodiments, the underlying strands include of E-glass or S-glass fiberglass. E-glass and S-glass are widely available from a variety of sources. Generally speaking, E-glass is understood to refer to alumina-calcium-borosilicate glasses used as general purpose reinforcement where strength and high electrical resistivity are desired, while S-glass is understood to refer to magnesium aluminosilicate glasses used for textile substrates or reinforcement in composite structural applications that require high strength, modulus, and durability under conditions of extreme temperature or corrosive environments. A variety of other types of fiberglass can be used including AR-glass, C-glass, D-glass, E-CR-glass, R-glass, and the like.

In some embodiments, the jacket 212 is braided as depicted in FIG. 3. In other embodiments, the jacket is formed by wrapping the plaits in a helical manner.

In an embodiment, one or more reinforcing strands can be incorporated one or more of the plaits 206. For example, one or more aramid, para-aramid, or aromatic polyester strands can be braided along with the fiberglass strands. Suitable aramids and para-aramids are sold under the KEVLAR® brand by E. I. du Pont de Nemours and Company of Wilmington, Del., under the TECHNORA® brand by Teijin Limited of Osaka, Japan, and under the TWARON® brand by Teijin Aramid B.V. of Arnhem, The Netherlands. Suitable aromatic polyesters are available under the VECTRAN® and VECTRAN® EX brands from Kuraray America, Inc. of Fort Mill, S.C. The ratio of fiberglass strands to reinforcing strands can, for example, be between 1:1 and 20:1.

The jacket 212 can be conductive or non-conductive. For example, jacket 104 can include a plurality of conductive particles such as metal particles (e.g., copper, aluminum, gold, silver, nickel, and the like), carbon black, carbon fibers, or other conductive additives. Such particles can be present in the individual strands of fiberglass, applied to fiberglass plaits 206, and/or applied to jacket 212 after formation. For example, any of the strands, plaits 206, or jacket 212 can be dipped in, sprayed with, coated with, or otherwise applied with a dispersion of conductive particles, which are then retained within plaits 206.

Jacket 212 can be sintered to inner tube 210 to provide structural stability that prevents or inhibits inner tube 210 from collapsing, deforming, or bursting.

Additional details regarding the underlying composite hose 102, 202 can be found, for example, in U.S. patent application Ser. No. 14/398,295, a national stage entry of PCT/US2012/046053 filed on Jul. 10, 2012, the entire contents of which is hereby incorporated by reference.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A hose assembly having reduced axial stress, the hose assembly comprising:
   an underlying composite hose including an inner tube and a braided jacket circumferentially surrounding the inner tube; and
   a first elongate matrix and a second elongate matrix, each of the first and second elongate matrices being formed of an elastomeric material bonded to an external surface of the braided jacket, the first and second elongate matrices extending along an axial length of the underlying composite hose and spanning between 10 and 120 degrees about a circumference of the external surface of the braided jacket, the second elongate matrix being spaced about 180 degrees from the first elongate matrix about the underlying composite hose, wherein the first and second elongate matrices and the external surface of the braided jacket exposed between the first and second elongate matrices define an outermost surface of the hose assembly, wherein at least one of the first and second elongate matrices includes at least one elongate rigid member having a spring constant based on the application of the hose assembly to tune vibration, and wherein the at least one elongate matrix imparts rigidity along the axial length of which it extends.

2. The hose assembly according to claim 1, wherein the elastomeric material comprises silicon.

3. The hose assembly according to claim 1, wherein the at least one elongate rigid member is embedded in an elastomeric material.

4. The hose assembly according to claim 3, wherein the at least one elongate rigid member comprises a steel rod or wire.

5. The hose assembly according to claim 3, wherein the elastomeric material comprises silicon.

6. The hose assembly according to claim 1, wherein the first and second elongate matrices lie in a plane of maximum vibration of the hose assembly.

7. The hose assembly according to claim 1, wherein each of the first and second elongate matrices include at least one elongate rigid member embedded in an elastomeric material.

8. The hose assembly according to claim 7, wherein the at least one elongate rigid member comprises a steel rod or wire.

9. The hose assembly according to claim 1, wherein each of the first and second matrices extends from about 30 degrees to about 100 degrees about a circumference of the external surface of the braided jacket.

10. The hose assembly according to claim 1, wherein each of the first and second matrices extends only a portion of a total length of the underlying composite hose.

11. The hose assembly according to claim 1, wherein each of the first and second matrices extends an entirety of a total length of the underlying composite hose.

12. A method of imparting rigidity to a flexible hose assembly in a first axis of vibration, while maintaining flexibility in other axes, the method comprising:

providing an underlying flexible composite hose including an inner tube and a braided jacket circumferentially surrounding the inner tube;

bonding a first elongate matrix formed of an elastomeric material to an external surface of the braided jacket along an axial length of the hose and spanning between 10 and 120 degrees about a circumference of the external surface; and bonding a second elongate matrix formed of an elastomeric material to the external surface of the braided jacket along an axial length of the hose and spaced 180 degrees from the first elongate matrix about the underlying composite hose, the second elongate matrix spanning between 10 and 120 degrees about a circumference of the external surface, wherein the first and second elongate matrices and the external surface of the braided jacket exposed between the first and second elongate matrices define an outermost surface of the hose assembly, wherein at least one of the first and second elongate matrices includes at least one elongate rigid member having a spring constant based on the application of the hose assembly to tune vibration, and wherein the at least one elongate matrix imparts rigidity along the axial length of the hose of which it extends.

13. The method of claim 12, wherein the elastomeric material comprises silicon.

14. The method of claim 12, wherein the at least one elongate rigid member comprises a steel rod or wire.

15. The method of claim 12, wherein the first and second elongate matrices lie in a plane of maximum vibration of the hose assembly.

16. The method of claim 12, wherein each of the first and second matrices extends from about 30 degrees to about 100 degrees about a circumference of the external surface of the braided jacket.

* * * * *